United States Patent Office 3,192,252
Patented June 29, 1965

3,192,252
PREPARATION OF SODIUM CYCLOHEXYL-SULPHAMATE
George Hall Donnison, South Wellfield, Whitley Bay, Northumberland, England, assignor, by mesne assignments, to Abbott Laboratories, North Chicago, Ill., a corporation of Illinois
No Drawing. Filed Sept. 18, 1961, Ser. No. 138,583
2 Claims. (Cl. 260—500)

The present invention relates to the preparation of sodium cyclohexylsulphamate.

In British Patent No. 662,800 there is described a process of producing metal salts of cyclohexylsulphamic acid which comprises treatment of cyclohexylamine with sulphamic acid, and hydrolysis of the resulting cyclohexylammonium-N-cyclohexylsulphamate with a metallic base to form the said salt. The step of treating the cyclohexylamine with sulphamic acid may be carried out in the absence of a solvent or in the presence of an inert solvent, preferably one with a boiling point in the range of 130° C. to 195° C.

The formation of the cyclohexylammonium-N-cyclohexylsulphamate from the cyclohexylamine and sulphamic acid involves the reaction of two moles of the cyclohexylamine per mole of sulphamic acid used as starting material and the liberation of one mole of ammonia. In one procedure described in the said specification, an excess of cyclohexylamine over and above the required two moles is used; the excess provides an excellent reaction medium and may thus be used as a solvent.

The main object of the present invention is to simplify the process described in British Patent No. 662,800 and to make it more economical in practice.

In accordance with the present invention the cyclohexylammonium-N-cyclohexylsulphamate is reacted with metallic sodium in the presence of an inert diluent at a temperature of between 100° C. and 135° C., preferably at about 130° C. The term "inert diluent" is used to express that such a diluent does not participate in the reaction, e.g. it will not react with any of the chemicals present in the reaction mixture, and particularly that it will not react with sodium. Examples of suitable inert diluents are cyclohexylamine, toluene and xylene.

The cyclohexylammonium-N-cyclohexylsulphamate is preferably produced as described in the aforesaid British Patent No. 662,800.

The sodium cyclohexylsulphamate may be recovered in the solid state by evaporating the reaction mixture to dryness.

The inert diluent is preferably cyclohexylamine. Its use necessarily simplifies the recovery of the cyclohexylamine which is produced as a by-product of the reaction, theoretically in an amount of one molar proportion; furthermore, a mixture of cyclohexylammonium-N-cyclohexylsulphamate and cyclohexylamine suitable for use with the sodium is readily obtained by reacting together, preferably at from 130° C. to 195° C. (e.g. at the atmospheric reflux temperature), cyclohexylamine and sulphamic acid in a molar ratio of not less than 2.1 until evolution of ammonia has substantially ceased.

The use of metallic sodium in accordance with the present invention would have been expected to be hazardous, especially when, as in a preferred procedure, the sodium is added to the mixture at the reaction temperature; the reaction in fact proceeds smoothly.

Compared with the process described in British Patent No. 662,800 wherein the sulphamate is hydrolysed with a base rather than with metallic sodium, the present process offers the following advantages:

(1) The reaction may be carried out under anhydrous conditions with the result that substantially all of the cyclohexylamine liberated is recovered directly in the anhydrous condition, no azeotropic distillation from an aqueous system being required, (2) The crude product comprising sodium cyclohexylsulphamate obtainable by evaporation of the reaction mixture to dryness (a) is substantially free from cyclohexylamine and (b) is reduced in amount by about 33% and thus requires a reduced expenditure of energy for its purification, (3) The simplified process gives a consequent increase in the throughput of the plant.

The following example is given in order to illustrate the invention.

Sulphamic acid (anhydrous, 100 g.) and cyclohexylamine (moisture content less than 0.05% by wt., 959 ml.) are introduced into a dry flask of one litre capacity equipped with a mechanical agitator and reflux condenser. The mixture is refluxed over an oil bath for 16 hours.

At the end of this period the external heating is reduced and sodium metal (23.75 g.) is charged to the mixture, which is then at a temperature of about 130° C., at a rate such that the batch continues to reflux gently. The sodium is added in any convenient solid form, for example as pellets, chunks, or wires, pellets being generally used, although the sodium melts when it enters the reaction medium so that the solid form of the metal is immaterial. Conveniently the sodium metal is fed into the reaction chamber at a controlled rate using an automatic feed such as a rotating worm feed.

After all the sodium has been added the batch is refluxed for at least three hours. The cyclohexylamine is then removed by distillation at a bath temperature of up to 145° C. under an ultimate vacuum of 635 mm. gauge or better, that is to say, the ultimate pressure is less than 125 mm.

To the sodium cyclohexylsulphamate remaining in the flask, ion-free water (500 ml.) is added and traces of cyclohexylamine are removed by azeotropic distillation. The pH of the solution is checked and if necessary is adjusted to 10 with a small quantity (c. 0.5 g.) of sodium hydroxide. When cyclohexylamine can be no longer detected in the distillate, charcoal (10 g.) is added and the volume of the batch adjusted to approximately 350 ml. The solution is filtered with the aid of the filter aid known as "Hyflo" through a pre-heated Büchner funnel and allowed to crystallise. The solids left on the funnel are washed with water and the filtrate added to the mother liquors which are concentrated by evaporation, treated with charcoal (5 g.) and filtered to yield a second crop. The first and second crops are combined and slurried with methanol (200 ml.) containing sufficient acetic acid to reduce the pH to 6.5. The slurried crystals are filtered off and dried.

The yield of sodium cyclohexylsulphamate from the combined first and second crops is 161.5 g. (78% based on the sulphamic acid).

The liquors from the second crop are concentrated, crystallised and filtered. The third crop crystals are washed with methyl alcohol which is collected in the third crop liquors where it produces a further precipitate of the product which is collected separately. The ultimate liquors are evaporated to dryness. The following quantities of product are obtained:

|  | G. |
|---|---|
| Third crop | 7.0 |
| Methyl alcohol precipitates | 2.7 |
| Residue from ultimate liquors | 3.5 |

The third crop and ultimate residues are combined and re-crystallised to yield 6 g. of sodium cyclohexylsulphamate.

The total yield of the product is 167.5 g. (81% based on the sulphamic acid).

The success of the method according to the present invention is unexpected, since it would have been supposed that the addition of metallic sodium to a reaction medium at a temperature in excess of 100° C. would have been too hazardous an operation to be practicable.

Others may practice the invention in any of the numerous ways which will be suggested to one skilled in the art by the present disclosure. All such practice of the invention is considered to be a part hereof, provided it falls within the scope of the appended claims.

I claim:
1. The process of preparing sodium cyclohexylsulphamate comprising
   adding to a solution of cyclohexylammonium-N-cyclohexylsulphamate in cyclohexylamine at a temperature above 100° C. a substantially equimolar amount of metallic sodium in solid form and heating the mixture until evolution of ammonia has substantially ceased.
2. The process of claim 1 whereby the sodium is added at a temperature of about 130° C.

References Cited by the Examiner
UNITED STATES PATENTS

| | | | |
|---|---|---|---|
| 2,383,617 | 8/45 | Robinson | 260—500 |
| 2,804,477 | 8/57 | McQuaid | 260—500 |
| 3,061,637 | 10/62 | Martinek | 260—500 |

FOREIGN PATENTS

| | | |
|---|---|---|
| 662,800 | 12/51 | Great Britain. |

LEON ZITVER, *Primary Examiner.*